(12) United States Patent
Henning et al.

(10) Patent No.: US 7,325,855 B2
(45) Date of Patent: Feb. 5, 2008

(54) UPLIFT BOW FOR A RETRACTABLE TARPING SYSTEM

(75) Inventors: Steven A. Henning, Anderson, IN (US); James R. Tuerk, Indianapolis, IN (US)

(73) Assignee: Aero Industries, Inc., Indianapolis, IN (US)

( * ) Notice: Subject to any disclaimer, the term of this patent is extended or adjusted under 35 U.S.C. 154(b) by 127 days.

(21) Appl. No.: 11/250,244

(22) Filed: Oct. 14, 2005

(65) Prior Publication Data

US 2007/0085369 A1  Apr. 19, 2007

(51) Int. Cl.
*B60P 7/02* (2006.01)
(52) U.S. Cl. ............................. 296/100.11; 296/100.01
(58) Field of Classification Search ........... 296/100.01, 296/100.11, 100.12, 100.17, 100.18
See application file for complete search history.

(56) References Cited

U.S. PATENT DOCUMENTS

| 6,315,514 | B1 | 11/2001 | Lindsey |
| 6,634,697 | B1* | 10/2003 | Petelka .................. 296/100.12 |
| 6,905,161 | B2* | 6/2005 | Fliege et al. ........... 296/100.12 |
| 2002/0093216 | A1* | 7/2002 | Ananian ................ 296/100.12 |

OTHER PUBLICATIONS

"Conestoga 2000 Tarping System-Assembly, Operation, Maintenance and Safety Instructions", © 2000, Aero Industries, Inc., Indianapolis, IN, 15 pages.

* cited by examiner

*Primary Examiner*—Lori L. Lyjak
(74) *Attorney, Agent, or Firm*—Maginot, Moore & Beck

(57) ABSTRACT

A bow structure for supporting a flexible cover or tarpaulin includes an intermediate bow and an uplift bow arrangement supported on the intermediate bow. The uplift bow arrangement includes a U-shaped bow supported on compression springs. The compression springs bias the bow along the axis of the bow arms, thereby exerting a generally upward force on the inside of the tarp.

28 Claims, 4 Drawing Sheets

UPLIFT BOW FOR A RETRACTABLE TARPING SYSTEM

BACKGROUND OF THE INVENTION

The present invention relates to retractable cover or tarping systems, and especially retractable tarping systems for use on a flat bed trailer.

Flat bed trailers are used to haul a variety of goods ranging from large heavy articles such as machinery to palletized goods. It is desirable, particularly with regard to weather sensitive goods, to provide a cover to protect a load during transit. Various types of cover systems have been used ranging from simple tarps held in place with cargo straps and tie downs to retractable tarp systems that cover and protect the entire trailer bed from weather and debris.

One such retractable tarp system is the CONESTOGA® tarp cover system manufactured and sold by Aero Industries of Indianapolis, Ind. Certain details of this type of cover system are disclosed in the U.S. Pat. No. 4,711,484, issued on Dec. 8, 1987, U.S. Pat. No. 4,902,064, issued on Feb. 20, 1990, and U.S. Pat. No. 5,538,313, issued on Jul. 23, 1996, all of which are owned by the assignee of the present invention. The disclosures of the '484, '064 and '313 Patents are incorporated herein by reference. The CONESTOGA® tarp system was developed to provide a tarp cover system that not only effectively encloses the cargo area but also protects or seals the tarp cover deployment system. The CONESTOGA® system includes a wheel and track deployment system that is supported at the outside edges of the trailer. In this manner, the entire trailer bed and the cargo are under cover.

A typical CONESTOGA® system installation is depicted in FIG. 1. In particular, the retractable tarping system 10 is mounted on the trailer flat bed T. The system 10 includes a flexible cover or tarpaulin 12 that can be folded or pleated as the rear and front bulkheads 13, 14 are drawn together. The tarp 12 is supported between the bulkheads by a bow structure 15. The bow structure includes a plurality of intermediate U-shaped bows 16 that span the width of the flat bed T. Each end of the bows is mounted to a carriage 18 that is slidably supported on corresponding rail 20 fixed to the flat bed. The carriages are configured so that they move along the rails to extend or retract the tarp system 10.

With flexible cover systems like the CONESTOGA® system, it is important to keep the tarp cover in tension. The tensioned tarp more effectively seals the cargo area from the elements, and resists flapping due to wind and road vibration. In the typical extendable tarp system, the tarp cover is stretched slightly on deployment and latched to rear and front bulkheads 13, 14. The CONESTOGA® system incorporates tensioning and locking mechanisms at the opposite ends of the tarp 12 to maintain this tension. The CONESTOGA® system includes tensioning mechanisms that account for changes in the length of the tarp over time. It is known that the tarp 12 will stretch as it is maintained in tension in its extended position. Thus, the tensioning mechanisms are configured to maintain longitudinal tension in the tarp that is uniform over the useful life of the tarping system.

In addition, the bow structure 15 incorporates bow elements that extend slightly above the plane of the top of the intermediate bows 16. For instance, the CONESTOGA® system includes U-shaped primary uplift bows 24 that are situated between successive intermediate bows 16. The uplift bows 24 are supported on the carriages 18 by legs 25. The primary uplift bows 24 are configured so that as the carriages 18 are retracted or moved towards each other, the bows 24 are elevated as the legs 25 are moved to a more vertical orientation. Thus, the primary uplift bows 24 help pleat or fold the tarp 12 as the tarp system is retracted, providing for a uniform retraction and avoiding problems with bunching of the tarp between intermediate bows 16.

Additional support for the tarp 12 may be provided by secondary uplift bows 30, sometimes called a triple uplift bow because two such bows 30 flank the intermediate bow 16. The U-shaped secondary uplift bows 30 are pivotably mounted to the intermediate bow 16 at a pair of brackets 32 fastened to opposite sides of the intermediate bow, as shown in FIGS. 2-3. Typically, the uplift bows 30 are tubular so they include a hollow interior 31. A cotter pin 34 passes through openings 38 in the arms of the bracket 32, and through bushings 36 pressed into openings 40 in the tubular bows 30. A washer 42 and cotter pin retainer 44 fix the cotter pin 34 to the bracket 32, which in turn pivotably mounts the end of the secondary uplift bow 30 to the intermediate bow 16. As with the primary uplift bows 24, the secondary bows 30 lift the tarp 12 to maintain the top of the tarp in tension. In addition, as the tarp system is retracted, the secondary uplift bows 30 pivot to a more vertical orientation, which again helps pleat or fold the tarp 12 as it is retracted and compressed.

In a typically cover or tarping system, the horizontal portions of the bows 16, 24 and 30 are held in contact with the tarp 12. Thus, in some systems, the tarp includes pocket spaced along the top of the tarp through which the horizontal portions of the bows extend. In other systems, a series of straps along the top of the tarp are used to connect the bows to the tarp. These straps may include a self-engaging fastener, such as VELCRO® ends, to make the connection.

It was noted above with respect to the tensioning and locking mechanisms that tarp 12 tends to stretch over time as it is repeatedly tensioned and relaxed. The tensioning mechanisms are useful to longitudinally tension the tarp, especially at the lower portions of the tarp. The bow system 15 is configured to help maintain the upper portion of the tarp in tension. However, even as the lower part of the tarp stretches, so too will the top of the tarp. In current tarping systems, the bow structures are not automatically capable of accounting for changes in length, and ultimately tension, in the top of the tarp. As the top of the tarp stretches, it begins to flap against the fixed dimension uplift and intermediate bows. What is needed, therefore, is a bow structure that automatically adjusts to the changing characteristics of the tarp that the bow structure is supporting.

SUMMARY OF THE INVENTION

In order to address this need, the present invention contemplates an uplift bow arrangement in which the U-shaped bow is supported on compression springs. The compression springs push the bow along the axis of the bow arms, thereby exerting a generally upward force on the inside of the tarp. This upward force is resisted by the tension in the tarp. However, as the tarp stretches and the tarp tension decreases, the compression spring pushes the uplift bow farther upward into the tarp to take up any slack that may exist. Thus, the spring-mounted up-lift bow restores tension in the tarp to provide a uniform upper surface and resists flapping of the tarp.

In accordance with one aspect of the invention, a bow structure is provided for supporting a cover system having a flexible cover maintained in tension in which the structure comprises at least one intermediate bow having a portion supporting the flexible cover, at least one uplift bow having a portion supporting the flexible cover, the uplift bow supported on the at least one intermediate bow, and a biasing mechanism disposed between the intermediate bow and the uplift bow for providing a biasing force on the uplift bow toward the flexible cover. In one embodiment, the biasing mechanism includes a resiliently compressible element disposed between the intermediate bow and the uplift bow. In a more specific embodiment, the biasing mechanism is a coil spring.

In accordance with certain features of the invention, the biasing mechanism includes a base mounted to the first support bracket and an elongated post projecting from the base and configured to support the spring. Preferably, the uplift bow is at least partially hollow and the elongated post is configured to slidably extend into the bow.

The base is configured to be pivotably mounted to the first support bracket so that the uplift bow can pivot as the cover system is moved between its extended and its compressed configurations. In one embodiment, the support bracket includes a substantially U-shaped bracket sized to pivotably receive the base therein and a pin spanning the bracket, and the base is configured to receive the pin therethrough when the base is received within the support bracket. In certain embodiments, the base defines a bore for receiving the pin therethrough when the base is received within the support bracket.

In other embodiments, the base defines a slot for receiving the pin therethrough when the base is received within the support bracket. The slot allows the base, and therefor the bow biasing mechanism, to be removed from the support bracket. This feature accommodates a further embodiment of the invention in which a second support bracket is provided on the intermediate bow at a position lower than the first bracket. The bow biasing mechanism and uplift bow can be dislodged from the upper or first support bracket and lowered to the second support bracket so that the uplift bow does not project as high relative to the intermediate bow.

In one embodiment, the support bracket includes a substantially U-shaped bracket sized to pivotably receive the base therein and opposing slots. The base defines opposite knobs projecting therefrom, each knob being sized and positioned to be received within a corresponding one of the opposing slots when the base is received within the U-shaped bracket. In this embodiment, the pin and bore configuration is not necessary. The slots in the support bracket are configured to capture the knobs of the base of the biasing mechanism while allowing the knobs to be manually inserted and removed from the slots. As a further alternative, the support bracket and base can be configured to form a ball-and-socket arrangement.

In a further embodiment, a bow biasing mechanism is provided for use with a cover system having a flexible cover supported by several intermediate bows and at least one uplift bow supported on each of the intermediate bows, wherein the intermediate bows include a bracket mounted thereon with a pivot pin passing through the bracket. In this embodiment, the mechanism comprises a base configured to be rotatably supported on the pivot pin of the bracket, a post projecting from the base and configured to slidably receive an uplift bow thereon, and a resiliently compressible element supported on the post between the base and an uplift bow received on the post to provide a biasing force on the uplift bow toward the flexible cover. The resiliently compressible element is preferably a coil spring. The base may define a bore or a slot for receiving the pin therethrough when the base is supported by the bracket.

In a further embodiment of the invention, a method is provided for supporting the cover of a compressible flexible cover system on a vehicle in which the cover is supported by several intermediate bows and several uplift bows, each of the uplift bow being pivotably mounted to a corresponding intermediate bow, each of the intermediate bows being slidably mounted on the vehicle to move the flexible cover from an extended configuration to a compressed configuration. In particular, the method comprises the steps of moving the flexible cover at least partially from the extended configuration toward the compressed configuration and moving each uplift bow from a first position on the corresponding intermediate bow to a lower second position on the intermediate bow with the uplift bow still supporting the flexible cover. With this method, the uplift bows are repositioned so as not to exceed any requirement or regulation with respect to the height of the flexible cover in its compressed configuration.

It is one object of the present invention to provide a bow structure for s flexible cover system that maintains tension in the cover system over the working life of the system. Another object is to limit vibration of the cover system in its extended configuration. Still another object is achieved by features of the invention that allow for modified positions of the bow structure to minimize the overall height of the cover system. Other objects and benefits of the invention will become apparent upon consideration of the following written description and accompanying figures.

DESCRIPTION OF THE PREFERRED EMBODIMENT

Figure 2:
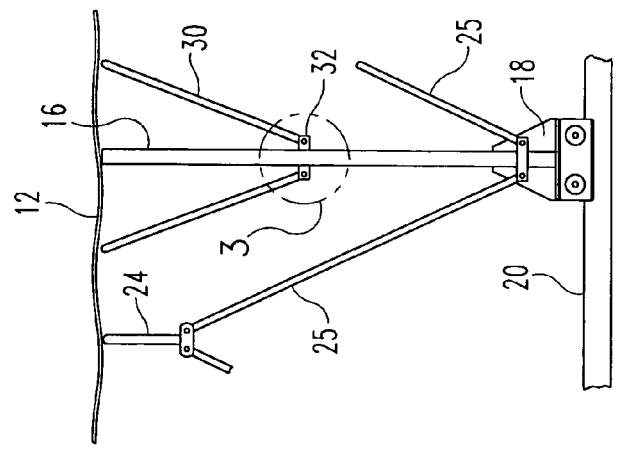
FIG. 2 is a side view of components of the bow structure of the tarping system depicted in FIG. 1.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

Figure 1:
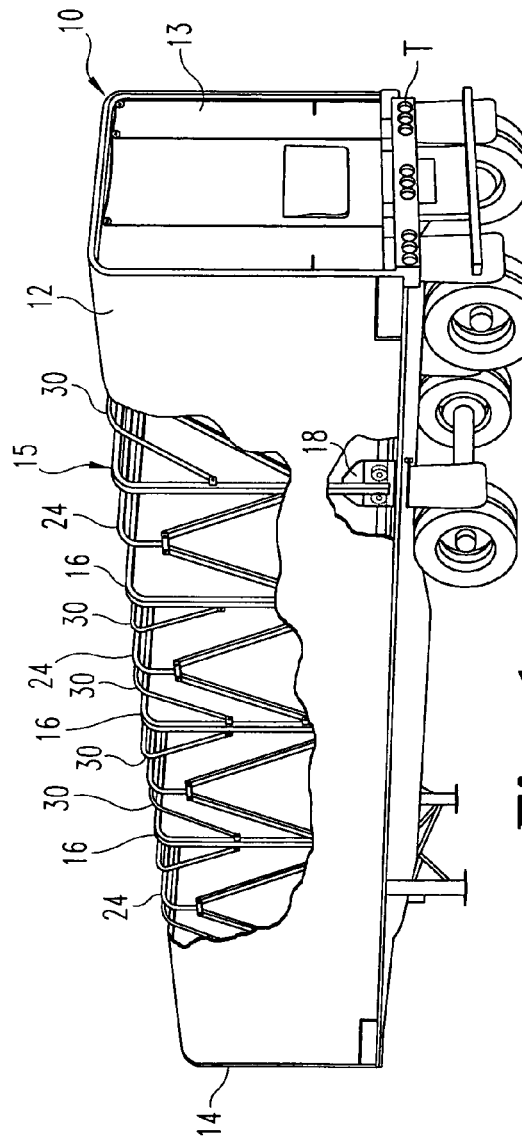
FIG. 1 is a rear perspective view of a retractable tarping system mounted on a trailer.

In accordance with one feature of the invention, the bow structure 15 of a tarping system, such as the system 10 shown in FIG. 1, is modified to provide an uplift bow arrangement that helps maintain tension in the top of the tarp 12, and to provide shock absorption for flexing of the tarp as the vehicle travels on or off road. In on the preferred embodiment, the uplift bow is spring-biased to tend to push the uplift bow upward into the tarp. The spring-biasing mechanism is pre-loaded so that the mechanism will maintain tarp tension through the expected range of tarp stretch over the useful life of the tarp. The pre-loading also allows the mechanism to expand as the cover system 10 is retracted and the tarp pleats or folds between the intermediate bows 16. In addition, the spring-biasing mechanism works against downward movement of the tarp due to wind or road vibration as the vehicle is traveling.

Figure 4:
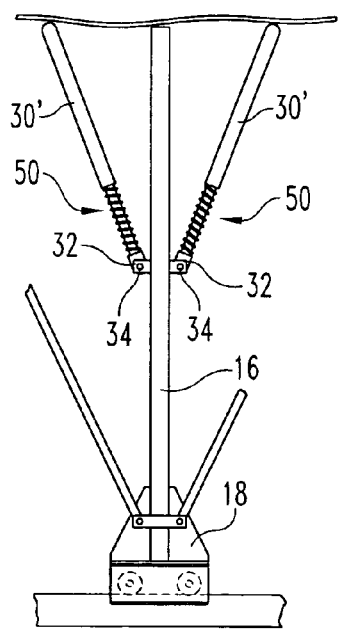
FIG. 4 is a side view of the components of a bow structure incorporating the bow biasing mechanism of one embodiment of the present invention.
Figure 5:
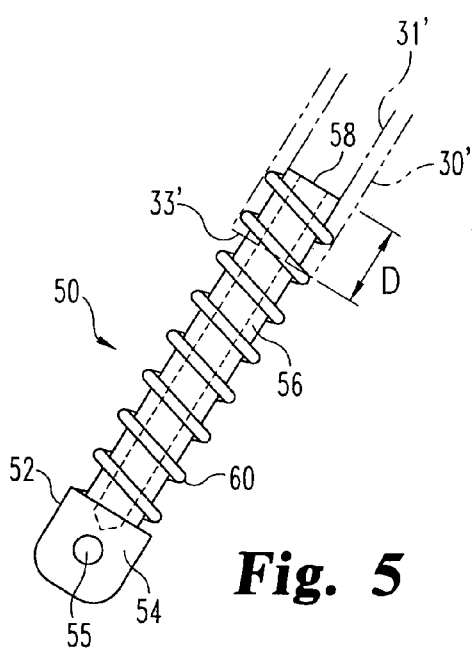
FIG. 5 is an enlarged side view of the bow biasing mechanism depicted in FIG. 4.
Figure 6:
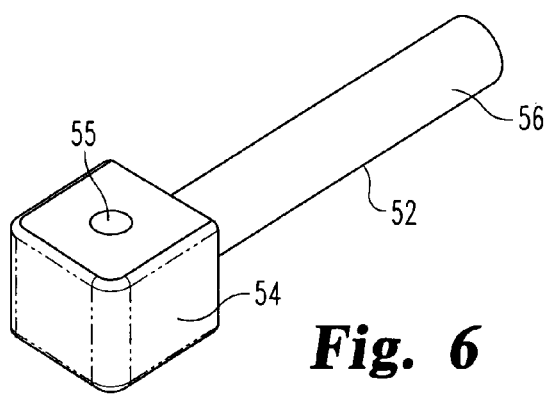
FIG. 6 is an enlarged perspective view of a spring guide in one embodiment of the invention.

One embodiment of the invention is depicted in FIGS. 4-6. A bow biasing mechanism 50 includes a spring guide 52 which may be in the form of an elongated post 56 with a hollow core 58 (FIG. 5). The tubular post 56 is configured to extend into the bore 31' of a modified secondary uplift bow 30'. The bow 30' is shortened, as shown in FIG. 4. The spring guide post 56 has a length sufficient to span between the support bracket 32 and the bottom edge 33' of the bow 30', and more particularly to extend sufficiently far into the bore 31' of the bow so that the spring guide cannot be dislodged from the bow during normal usage of the tarping system. The spring guide post 56 also preferably extends sufficiently far into the secondary bow 30' so that the bow does not wobble about the spring guide during use.

The bow biasing mechanism 50 includes a base 54 from which the spring guide post 56 projects. The base 54 defines a bore 55 that aligns with the holes 38 in the support bracket 32 to receive the cotter pin 34 therethrough. Thus, the base 54 is pivotably mounted to the support bracket in the same manner as the secondary uplift bow 30 described above.

The spring guide 52 supports a spring 60 that is mounted over the post 56. The spring 60 is preferably a coil spring with a free length that may be approximately the length of the post 56. The spring is compressed a distance D when the secondary uplift bow 30' is mounted on the post. This compression of the spring pre-loads the bow biasing mechanism 50 so that the mechanism exerts a force against the tarp 12 to maintain the tarp in tension. Of course, as the tarp stretches, the uplift bow 30' moves upward to continue to maintain the tarp in tension, which in turn reduces the amount of compression D of the spring 60. The length of the post 56, the free length of the spring 60 and the amount of initial compression D of the spring are all calibrated so that the spring can continue to apply a tension force against the tarp even as it stretches during its useful life.

Figure 7:
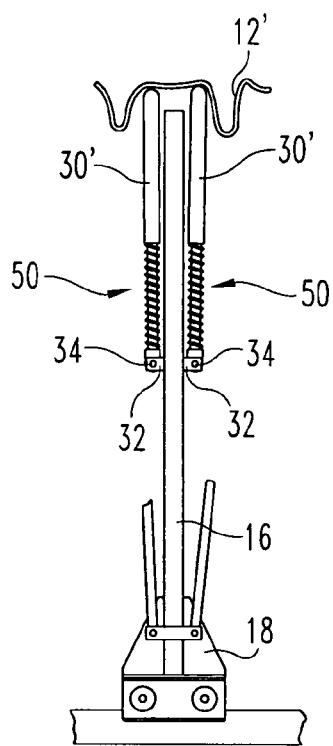
FIG. 7 is a side view of the bow structure depicted in FIG. 4 shown with the cover system in its retracted configuration.

In addition, these relative dimensions must be calibrated so that the bow biasing mechanism 50 remains intact when the cover system is retracted. As explained above, when the cover system 10 is retracted or compressed, the tarp 12' pleats or folds between the intermediate bows 16, as illustrated in FIG. 7. These folds elevate the tarp so that the secondary uplift bow 30' must extend to maintain contact with the tarp. The spring-biased uplift bows 30' facilitate this pleating effect, which ultimately allows the cover system to retract in an orderly manner to the smallest collapsed length possible. While the present description incorporates the bow biasing mechanism into the secondary uplift bows, the same mechanism may be implemented in the primary uplift bows 16. Similar dimensional considerations apply to sizing the biasing mechanism 50 when used in the primary uplift bows 16.

The spring guide 52 is preferably formed of a strong but low-friction material or bearing-like material to facilitate sliding of the bow 30' along the post 56. In one specific embodiment, at least the post 56, and preferably the entire spring guide 52, is formed of a plastic or a polymer, such as NYLON 6 or UHMW Black. The spring is a standard coil spring with a wire diameter of about 0.15 inches and a pitch diameter of about 0.75 inches. The coil pitch and free length are adjusted based on the amount of desired biasing or shock absorption force. It is also contemplated that the spring guide itself, and particularly the base 54, may provide some shock absorption capability. Thus, the base may deflect under load from the spring 60, depending upon the material of the base. In the illustrated embodiment, the polymer material will provide this shock absorption capability.

In the illustrated embodiment, the bow biasing mechanism 50 includes a single linear coil spring. However, other biasing mechanisms are contemplated. For instance, the spring 60 may be configured to provide a non-linear biasing force. With the spring 60 depicted in FIGS. 4-5, as the spring compression decreases, the biasing force decreases, which means that the tensioning force applied to the tarp 12 also decreases. A non-linear spring may maintain a constant tensioning force through the expected range of spring compressions D. In a related alternative arrangement, a second spring may be concentrically disposed on the spring guide 52 in which the second spring has a shorter free length than the primary spring 60. This additional spring would thus provide an additional biasing force at greater compressions D but would not provide any biasing force once the amount of compression recedes from the free length of the added spring.

In another modification, the spring 60 may be provided with washers or caps at the ends to bear against the base 54 and the bottom edge 33' of the bow 31'. In certain embodiments, the post 56 may be replaced with an outer tube that fits concentrically over the spring 60 and the end of the bow 30'. With this embodiment, the telescoping relationship between the spring guide 52 and the bow 30' would be maintained, but would be reversed from the relationship depicted in FIG. 5. With this alternative embodiment, the outer tube would support the spring and keep it form buckling as it is depressed by the bow.

In the most preferred embodiments, the biasing mechanism 50 utilizes a coil spring due to its simplicity, ease of assembly and ease of replacement. Other springs may be suitably adapted to provide a biasing force to the uplift bow, such as leaf or conical helical springs. Moreover, other passive biasing elements are contemplated, such as a resiliently compressible bushing that is supported between the end of the secondary uplift bow 30' and the base 54 of the spring guide 52. Although less desirable, active biasing elements may also be used, such as a pneumatic/hydraulic spring or cylinder.

It should be understood that the bow biasing mechanism 50 may be used on any of the uplift bows, including on the primary uplift bows 24. The bow biasing mechanism may be incorporated into the bow 24 itself or in the side legs 25 supporting the bow.

Figure 8:
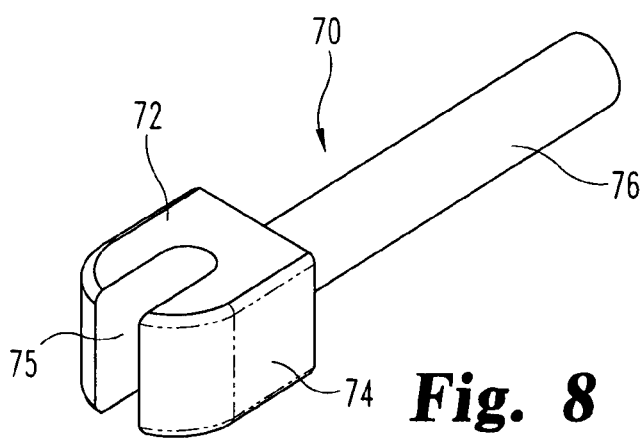
FIG. 8 is an enlarged perspective view of a spring guide according to a further embodiment of the invention.

As shown in FIG. 7, the bow biasing mechanism 50 allows the uplift bows 30' to extend above the top of the intermediate bows 16 when the tarp system is compressed or retracted. In some installations, this elevation of the tarp 12' is acceptable; however, in many road transport installations involving a full height cover system 10, this height increase exceeds DOT regulations. On solution may be to limit the amount of extension of the uplift bow 30' relative to the spring guide 52. In an alternative embodiment, a modified spring guide 72 is provided as part of a bow biasing mechanism 70, as shown in FIGS. 8-9.

Figure 3:
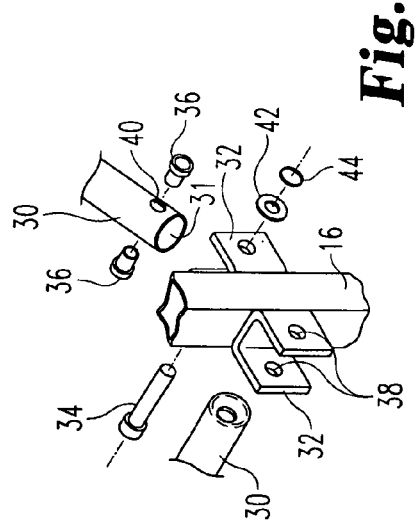
FIG. 3 is an enlarged top perspective view of the manner in which a secondary uplift bow is mounted to an intermediate bow of the bow structure shown in FIG. 1.

The spring guide 72 includes a base 74 that defines a slot 75, rather than the opening 55 formed in the base 54 of the embodiment shown in FIG. 6. The guide includes a post 76 extending from the base that is configured to support a biasing spring, such as the spring 60 (FIG. 5). The slot 75 is sized to snugly fit about the pin 34 passing through the bracket 32 (FIGS. 3 and 7), but is long enough so that the base cannot be dislodged from the pin 34 when the uplift bow 30' is in contact with the tarp 12. The spring guide 72 can pivot about the pin in the same manner as the spring guide 52 in the prior embodiment. The spring force of the spring 60 and the tension in the tarp 12, 12' will exert a force along the axis of the spring guide 72 sufficient to maintain the base in contact with the pin, or more particularly the pin within the slot 75.

Figure 9:
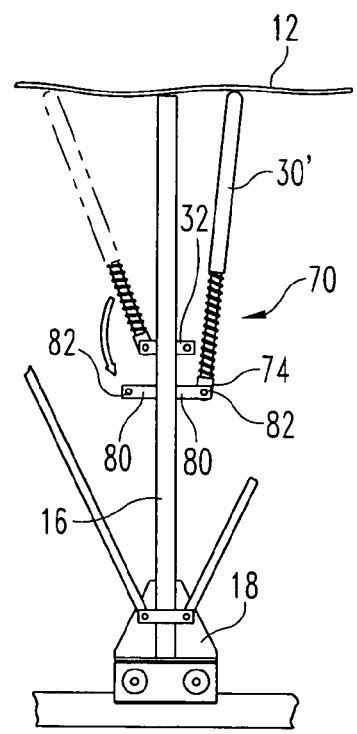
FIG. 9 is a side view of a bow structure incorporating the spring guide illustrated in FIG. 8, shown with the cover system in its retracted configuration.

The spring guide 72 of this embodiment introduces another feature in an alternative embodiment of the invention, as reflected in FIG. 9. Since the base 74 includes a slot 75, the spring guide 72 may be manually dislodged from the pin 34 in the bracket 32. Moreover, the spring guide 72 can then be mounted on another pin 82 of a bracket 80. As shown in FIG. 9, this second bracket is positioned lower on the intermediate bow 16 than the previous bracket 32. In this location, the lower bracket 80 avoids the problem of the uplift bow 30' projecting too far above the top of the intermediate bow, or too far above the DOT regulated height for the cover system. Thus, when it is desired to retract or compress the cover system, the uplift bows 30' and associated bow biasing mechanisms 70 can be dislodged from the upper brackets 32 and repositioned on the pin 82 of the lower bracket 80. Then, as the cover is compressed and the tarp tension allows the uplift bow 30' to extend upward, the upward extent of the bow will stay below the necessary height limit.

Figure 10:
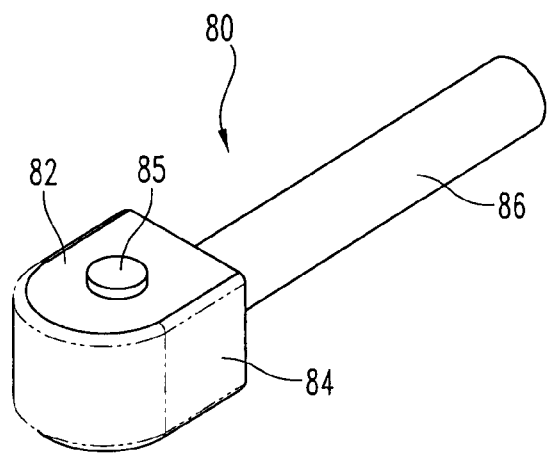
FIG. 10 is a perspective view of a spring guide according to yet another embodiment of the invention.

Under certain use conditions, road and tarp vibration may cause oscillation of the base 54 of the spring guide 52 within the support bracket 32. This oscillation can result in wallowing of the pin 34 within the bore 55, thereby enlarging and/or elongating the bore 55. This slop between the spring guide and the support bracket produces annoying noise and may eventually cause the fracture of the base 54. The use of the bushings 36 doesn't eliminate this wallowing problem as the bushings themselves become deformed. In order to address this condition, a spring guide 80 may be utilized, as illustrated in FIG. 10. This alternative spring guide includes a base 82 with a post 86 projecting therefrom that is sized to support the spring 60 (FIG. 5). The outer surface 84 of the base 82 may be rounded to permit pivoting of the base within a support bracket.

In one feature of this embodiment, instead of a bore to receive a pin 34, the base 82 defines a pair of knobs 85 projecting from the sides of the base, as illustrated in FIG. 10. The knobs 85 operate as a pivot axle for the spring guide 80, replacing the pin 34 of the prior embodiments. In one specific embodiment, the knobs 85 are sized to fit within the openings 38 of the bracket 32 (FIG. 3), while the base 82 is sized to fit within the space between the two arms of the bracket. In this specific embodiment, the arms of the bracket 32 would deflect slightly to allow the base 82 to enter the bracket and the knobs 85 to snap into the openings 38. In this embodiment, the base 82 is configured to eliminate the pivot pin of the prior embodiment. As a further modification, the base 82 and bracket 32 may be configured to form a ball-and-socket arrangement. The bracket in this alternative would be configured to capture the base, which would be generally spherical with the stem 86 projecting therefrom.

Figure 11:
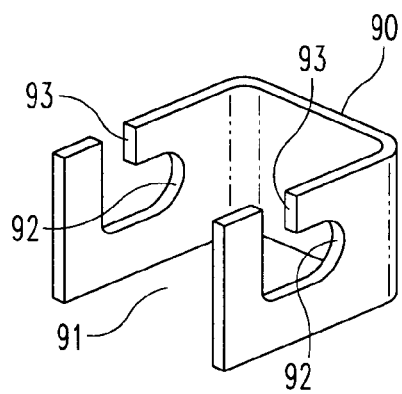
FIG. 11 is a perspective view of a support bracket modified to accept the spring guide shown in FIG. 10.

In an alternative embodiment, the support brackets themselves are also modified to accept the modified spring guide 80. In one embodiment, the support bracket 90 is generally U-shaped to define a slot 91 between the arms of the bracket to receive the base 82 of the spring guide 80, as shown in FIG. 11. A capture slot 92 is defined in each arm of the bracket 90 in which the width of the slot is slightly larger than the diameter of the knobs 85. The capture slots 92 communicate with an entry slot 93 that is sized to allow the knobs to enter and to be guided into the back end of the capture slot. The entry slot 93 is oriented relative to the capture slot 92 so that the knobs 85 of the spring guide 80 will be pushed into the capture slot under normal loading and use conditions. In other words, the normal force vector along the axis of the spring guide post 86 tends to push the base 82 toward the back of the capture slots 92 and away from the entry slots 93. If desired, a clip (not shown) may be positioned over the entry slots to prevent removal of the base 82 from the support bracket 90 under any conditions. However, it is preferable that the entry slots remain open so that the spring guide 80 may be quickly and easily removed from the support bracket. It is contemplated that two sets of support brackets 90 will be provided, as depicted in FIG. 9 so that the spring guide post and associated uplift bow (30') can be raised or lowered as desired.

Figure 12:
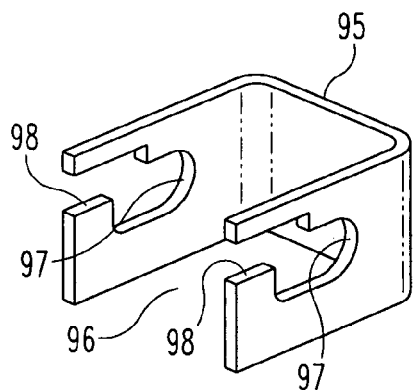
FIG. 12 is a perspective view of an alternative support bracket modified to accept the spring guide shown in FIG. 10.

In an alternative embodiment, a support bracket 95 is provided that is substantially U-shaped and that defines a slot 96 to receive the spring guide base 82, as shown in FIG. 12. Like the bracket 90, the bracket 95 defines a capture slot 97 in each arm of the bracket to receive and capture the knobs 85 of the spring guide 80. The capture slots 97 open to entry slots 98 that are oriented differently than the entry slots 93 of the prior embodiment. In the prior embodiment of FIG. 11, the spring guide base is introduced into the support bracket 90 from the top, transverse to the axis of the capture slot 92. In the embodiment of FIG. 12, the entry slot 98 is aligned parallel to the axis of the capture slot 97 so that the spring guide base is introduced into the support bracket 95 from the side of the bracket. In either embodiment, the entry slot is oriented so that the spring guide 80 must be deliberately manipulated to be removed from the support bracket.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

For instance, in the illustrated embodiment, the bow biasing mechanism of the present invention is supported on intermediate bows of the bow structure 15. In some short systems, there are no intermediate bows, only front and rear bows. In these systems, the bow biasing mechanisms of the present invention will be mounted on those available bows in the manner described.

What is claimed is:

1. A bow structure for supporting a cover system having a flexible cover maintained in tension, comprising:
   at least one bow having a portion supporting the flexible cover;
   at least one uplift bow having a portion supporting the flexible cover, said uplift bow supported on said at least one bow; and
   a biasing mechanism disposed between said bow and said uplift bow for providing a biasing force on said uplift bow toward the flexible cover.

2. The bow structure of claim 1, wherein said biasing mechanism includes a resiliently compressible element disposed between said at least one bow and said uplift bow.

3. The bow structure of claim 2, wherein:
   said at least one bow includes a first support bracket mounted thereon; and
   said resiliently compressible element is disposed between said first support bracket and said uplift bow.

4. The bow structure of claim 3, wherein:
   said resiliently compressible element is a spring; and
   said biasing mechanism includes:
     a base mounted to said first support bracket; and
     an elongated post projecting from said base and configured to support said spring.

5. The bow structure of claim 4, wherein said uplift bow is at least partially hollow and said elongated post is configured to slidably extend into said bow.

6. The bow structure of claim 4, wherein said spring is a coil spring.

7. The bow structure of claim 4, wherein said base is pivotably mounted to said first support bracket.

8. The bow structure of claim 7, wherein:
   said support bracket includes a substantially U-shaped bracket sized to pivotably receive said base therein and a pin spanning said bracket; and
   said base is configured to receive said pin therethrough when said base is received within said support bracket.

9. The bow structure of claim 8, wherein said base defines a bore for receiving said pin therethrough when said base is received within said first support bracket.

10. The bow structure of claim 8, wherein said base defines a slot for receiving said pin therethrough when said base is received within said support bracket.

11. The bow structure of claim 7, wherein said first support bracket and said base are configured to form a removable pivoting engagement therebetween.

12. The bow structure of claim 11, wherein:
    said first support bracket includes a substantially U-shaped bracket sized to pivotably receive said base therein and opposing slots; and
    said base defines opposite knobs projecting therefrom, each knob being sized and positioned to be received within a corresponding one of said opposing slots when said base is received within said U-shaped bracket.

13. The bow structure of claim 4, wherein:
    said at least one bow includes a second support bracket mounted thereon below said first support bracket; and
    said base is configured to be mountable to either said first or said second support bracket.

14. The bow structure of claim 13, wherein:
    said first and second support brackets each include a substantially U-shaped bracket sized to pivotably receive said base therein and a pin spanning said bracket; and
    said base is configured to receive said pin therethrough when said base is received within either of said support brackets.

15. The bow structure of claim 14, wherein said base defines a slot for receiving said pin therethrough when said base is received within either of said support brackets.

16. A bow biasing mechanism for use with a cover system having a flexible cover supported by at least two bows and at least one uplift bow supported on each of the at least two bows, each of the at least two bows including a bracket mounted thereon with a pivot pin passing through the bracket, said mechanism comprising:
    a base configured to be rotatably supported on the pivot pin of the bracket;
    a post projecting from said base and configured to slidably receive an uplift bow thereon; and
    a resiliently compressible element supported on said post between said base and an uplift bow received on said post to provide a biasing force on the uplift bow toward the flexible cover.

17. The bow biasing mechanism of claim 16, wherein said resiliently compressible element is a coil spring.

18. The bow biasing mechanism of claim 16, wherein said base defines a bore for receiving the pin therethrough when said base is supported by the bracket.

19. The bow biasing mechanism of claim 16, wherein said base defines a slot for receiving the pin therethrough when said base is supported by the bracket.

20. A method for supporting the cover of a compressible flexible cover system on a vehicle in which the cover is supported by several intermediate bows and several uplift bows, each of the uplift bow being pivotably mounted to a corresponding intermediate bow, each of the intermediate bows being slidably mounted on the vehicle to move the flexible cover from an extended configuration to a compressed configuration, the method comprising:
    moving the flexible cover at least partially from the extended configuration toward the compressed configuration; and
    moving each uplift bow from a pivotable mount at a first position on the corresponding intermediate bow to a pivotable mount at a lower second position on the intermediate bow with the uplift bow still supporting the flexible cover.

21. A bow structure for supporting a cover system having a flexible cover, comprising:
    at least one bow having a portion supporting the flexible cover;
    at least one uplift bow having a portion supporting the flexible cover;
    a bow support disposed between said at least one bow and said at least one uplift bow for supporting said at least one uplift bow; and
    an upper bracket and a lower bracket attached to said at least one bow, each of said brackets configured to removably support said bow support.

22. The bow structure of claim 21, wherein said bow support includes:
    a base configured to be removably mounted to each of said brackets; and
    an elongated post projecting from said base and configured to support at least one uplift bow thereon.

23. The bow structure of claim 22, wherein said at least one uplift bow is at least partially hollow and said elongated post is configured to slidably extend into said bow.

24. The bow structure of claim 22, wherein said base is configured to pivot within each of said support brackets when mounted thereon.

25. The bow structure of claim 24, wherein:
- each of said support brackets includes a substantially U-shaped bracket sized to pivotably receive said base therein and a pin spanning said bracket; and
- said base is configured to receive said pin therethrough when said base is received within said U-shaped bracket.

26. The bow structure of claim 25, wherein said base defines a bore for receiving said pin therethrough when base is received within said U-shaped bracket.

27. The bow structure of claim 25, wherein said base defines a slot for receiving said pin therethrough when said base is received within said U-shaped bracket.

28. The bow structure of claim 24, wherein:
- each of said support brackets includes a substantially U-shaped bracket sized to pivotably receive said base therein and opposing slots; and
- said base defines opposite knobs projecting therefrom, each knob being sized and positioned to be received within a corresponding one of said opposing slots when said base is received within said U-shaped bracket.

* * * * *